United States Patent [19]
Westphal

[11] Patent Number: 5,338,339
[45] Date of Patent: Aug. 16, 1994

[54] APPARATUS AND METHOD FOR REMOVING RESINATED WOOD PARTICLES FROM AN AIR STREAM

[75] Inventor: John L. Westphal, Tualatin, Oreg.

[73] Assignee: Louisiana-Pacific Corporation, Hayden Lake, Id.

[21] Appl. No.: 867,593

[22] Filed: Apr. 13, 1992

[51] Int. Cl.⁵ .............................................. B01D 46/04
[52] U.S. Cl. ......................................... 95/282; 55/304; 55/320; 55/497; 55/521
[58] Field of Search ................... 55/96, 213, 300, 302, 55/304, 320, 321, 483, 497, 521, 525

[56] References Cited

U.S. PATENT DOCUMENTS

| | | | |
|---|---|---|---|
| 3,486,309 | 12/1969 | Wild | 55/483 X |
| 4,193,780 | 3/1980 | Cotton et al. | 55/483 X |
| 4,655,797 | 4/1987 | Iniotakis et al. | 55/525 X |
| 4,655,805 | 4/1987 | Krantz | 55/497 X |
| 4,764,355 | 8/1988 | Romey et al. | 55/304 X |
| 4,810,270 | 3/1989 | Terry et al. | 55/525 X |
| 4,904,282 | 2/1990 | Stuble et al. | 55/96 |

OTHER PUBLICATIONS

York Company, Inc. Bulletin 42, "The Demister" Received Group 170 Sep. 14, 1973.

Primary Examiner—Charles Hart
Attorney, Agent, or Firm—Marger, Johnson, McCollom & Stolowitz

[57] ABSTRACT

An apparatus and process are provided for removing particles from an air stream by filtration, particularly wood particles which have been treated with a resinous material, and which therefore are somewhat sticky. The apparatus is a filter system in which an air stream carrying the resinated particulates is directed upwardly through a set of filter elements which are arranged in a generally sawtooth pattern. The filter elements include a relatively large mesh screen to which the sticky particulates adhere and form of a filtering layer on the mesh in situ. As the filtering layer grows, its porosity is continually reduced, until it reaches a minimum acceptable level, at which time the filter elements are vibrated to cause a portion of the filtering layer to fall away, leaving a portion of the layer adhering to the filter element. In this way, continuous, high-efficiency filtering of a sticky particulate from an air stream is achieved.

24 Claims, 12 Drawing Sheets

APPARATUS AND METHOD FOR REMOVING RESINATED WOOD PARTICLES FROM AN AIR STREAM

BACKGROUND OF THE INVENTION

Field of the Invention

The present invention relates generally to filter systems for removing particulate solids from an air stream, and in particular to filter systems for continuously removing resinated wood particles and fibers from an air stream.

Description of the Related Art

Filter systems used for continuously removing small particulate solids, such as wood particles and fibers, from an air stream include cyclone separators, bag house filter systems, and porous static filter elements. Each of these types of system has its advantages and disadvantages. Cyclone separators are simple and inexpensive to build, install and maintain. Cyclones' main utility is to separate a single fluid stream having entrained particles over a range of sizes into two or more air streams, namely an underflow stream containing the particles over a predetermined size, and an overflow stream containing the particles under a predetermined size. Cyclones are limited however in their ability to separate very small sized particles from an air stream. Therefore if the cyclone overflow stream is to be discharged to the environment, further treatment to remove a portion of the small particles from the cyclone overflow stream may be required.

Bag houses on the other hand are generally very effective at removing a high percentage of entrained particles down to a very small size from an air stream. Unfortunately, bag house systems capable of filtering large volume air streams are large, complex, and involve high maintenance costs. The primary reason that bag house filter systems are relatively large is that they are designed to separate the solids from the air stream by reducing the velocity of the air stream to approximately 1–3 feet per minute as the air stream passes through the bag element. As a result, a relatively large surface area is required, and may require a thousand or more large bags in some industrial applications. These bags must be connected by a piping system to deliver the air stream to them, and require frequent attention to keep the operating satisfactorily.

Additional difficulties may arise with bag house filtering systems if the solids to be separated are tacky or sticky. Solids which are not free flowing can plug the air distribution system or the bags themselves. Bag house systems are also very susceptible to fire caused by static charges in the vicinity of oxygen containing air carrying finely divided entrained solids. If the solids contain additional flammable materials, such as hydrocarbon resins, the fire danger is further aggravated. The cost of a bag house system is therefore extremely high, and such a system may not be able to provide safe and continuous operation.

Flat filter elements are also well-known means for continuously removing small particulate solids from an air stream, but their use on an industrial has not always proven acceptable, especially in the removal of sticky resinated particles mentioned above. Problems associated with flat filter elements include designing a filter element having sufficient porosity for maintaining a satisfactory flow rate while at the same time removing small particles. In the case of sticky particles, this problem is particularly difficult to solve. In addition, as solids accumulate and compact on a flat filter element, the throughput of the element is decreased further. If the pores of the filter are enlarged to increase air flow through the element, the small entrained particles are not satisfactorily retained on the filter element.

A need therefore remains for a compact, relatively inexpensive filter system for removing small particles from a relatively high-volume air stream, and which will continuously remove small and relatively sticky particles, such as resinated wood particles, from the air stream.

SUMMARY

The present invention meets the need for a compact, relatively inexpensive filter system for removing small particles from a relatively high-volume air stream, and which will continuously remove small and relatively sticky particles, such as resinated wood particles, from the air stream. The present invention is embodied in a filter system comprising means defining an air stream inlet for receiving an air stream containing ligno-cellulosic particles and fibers, means for directing said air stream along a predetermined path, said air stream flowing in a generally upward direction along at least a portion of said path, a filter assembly disposed in said path for removing said particles and fibers from said upwardly flowing air stream.

The filter assembly comprises one or more non-horizontal, foraminous filter elements and a foraminous filtering layer comprising said ligno-cellulosic particles and fibers formed on each filter element, the filters layer having a minimum porosity sufficient to allow said air stream to pass therethrough. Each filter element, which may comprise a screen, and preferably a 6-mesh screen, has openings which are sized to allow the airstream to pass through while retaining a portion of the particles and fibers on said filter element for forming a foraminous filtering layer in situ. the plurality of filter elements are preferably arranged in a generally sawtooth pattern.

The filter system and process further comprise means for maintaining the minimum filter layer porosity, preferably by intermittently reducing the thickness of said filter layer by removing a portion thereof. A portion of the filtering layer may be removed by intermittently vibrating said filter assembly with an impulse vibrator. Said filter layer removal means may be activated in response to a predetermined pressure drop across said filter assembly, or may be activated at predetermined time intervals.

A filter system according to the present invention may further comprise means for collecting and removing said collected filter layer portions from said filter assembly. The collecting means preferably comprises a hopper below said filter elements into which said solids fall under the influence of gravity. An auger assembly may be provided for receiving the collected solids and conveying them out of the filter system for disposal.

The present invention also provides a method for removing ligno-cellulosic particles and fibers from an air stream comprising the steps of introducing an air stream containing entrained particulates into a filter system as just described above, introducing the air stream containing ligno-cellulosic particles and fibers into said air inlet and passing said air stream through said filter element, retaining said first portion of particles and fibers on said filter element, thereby forming a foraminous filtering layer of said particles and fibers having a minimum porosity sufficient to allow said air stream to pass therethrough, retaining a second portion of said particles and fibers on said filtering layer, and discharging a filtered air stream from said filter system. The method preferably includes said air stream containing entrained solids being passed through said filter element at a velocity greater than 20 feet per minute.

The method comprises the step of maintaining said minimum filtering layer porosity, preferably by intermittently reducing the thickness of said filter layer by removing a portion thereof, preferably by intermittently vibrating said filter assembly. The method may include the step of reducing the thickness of said filter layer by removing a portion thereof. The step may be initiated in response to a predetermined pressure drop across the filter assembly, or at a predetermined time interval.

The method preferably removes more than approximately 90% of said entrained solids from said air stream containing entrained solids. The method preferably discharges less than about 2 pounds per hour of entrained solids to the surrounding environment.

These and other features of the present invention will be described with reference to the figures and the description of the preferred embodiment.

DETAILED DESCRIPTION OF THE PREFERRED EMBODIMENT

Figure 1:
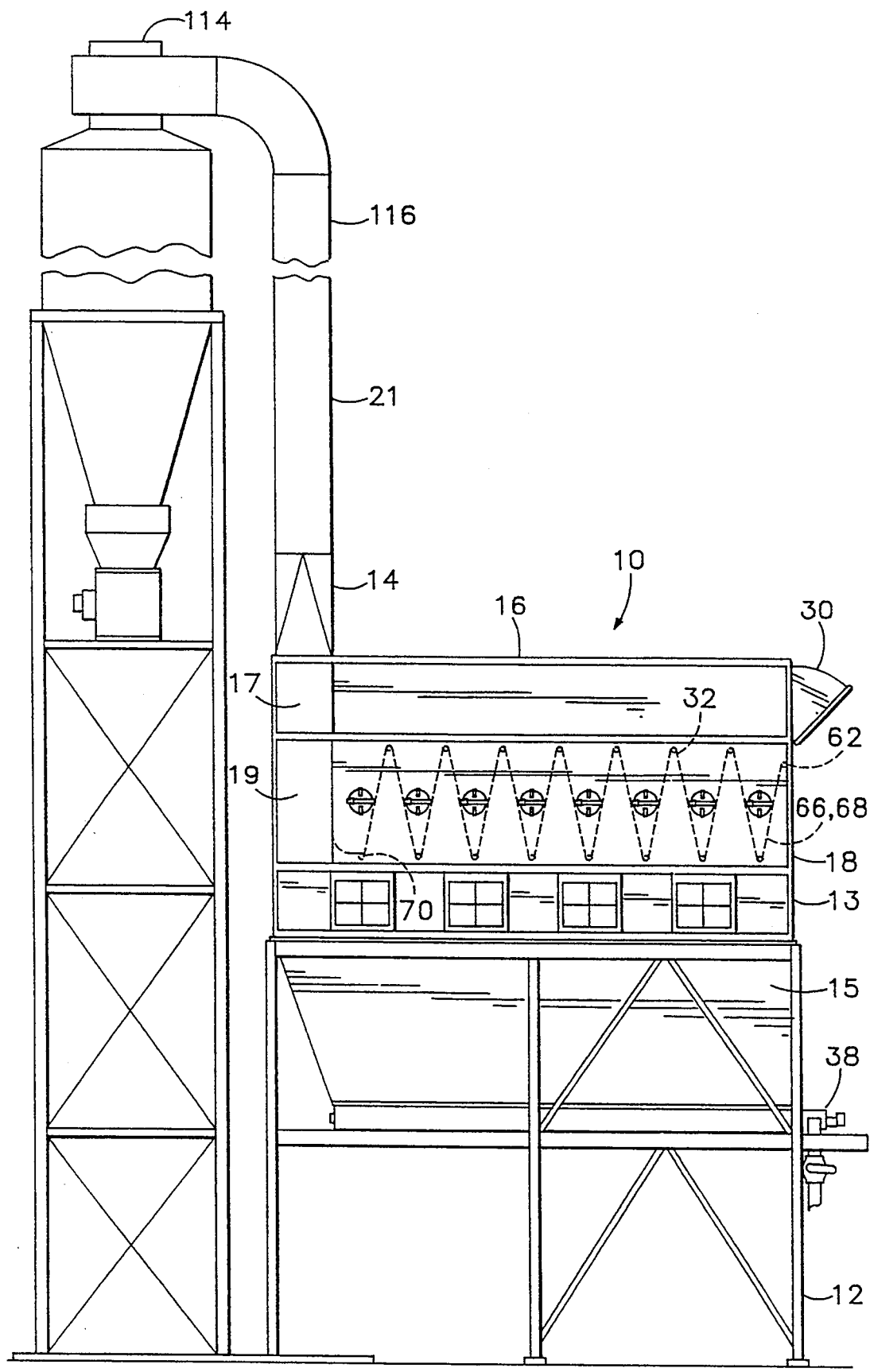
FIG. 1 shows a side view of a filter system according to the present invention.
Figure 2:
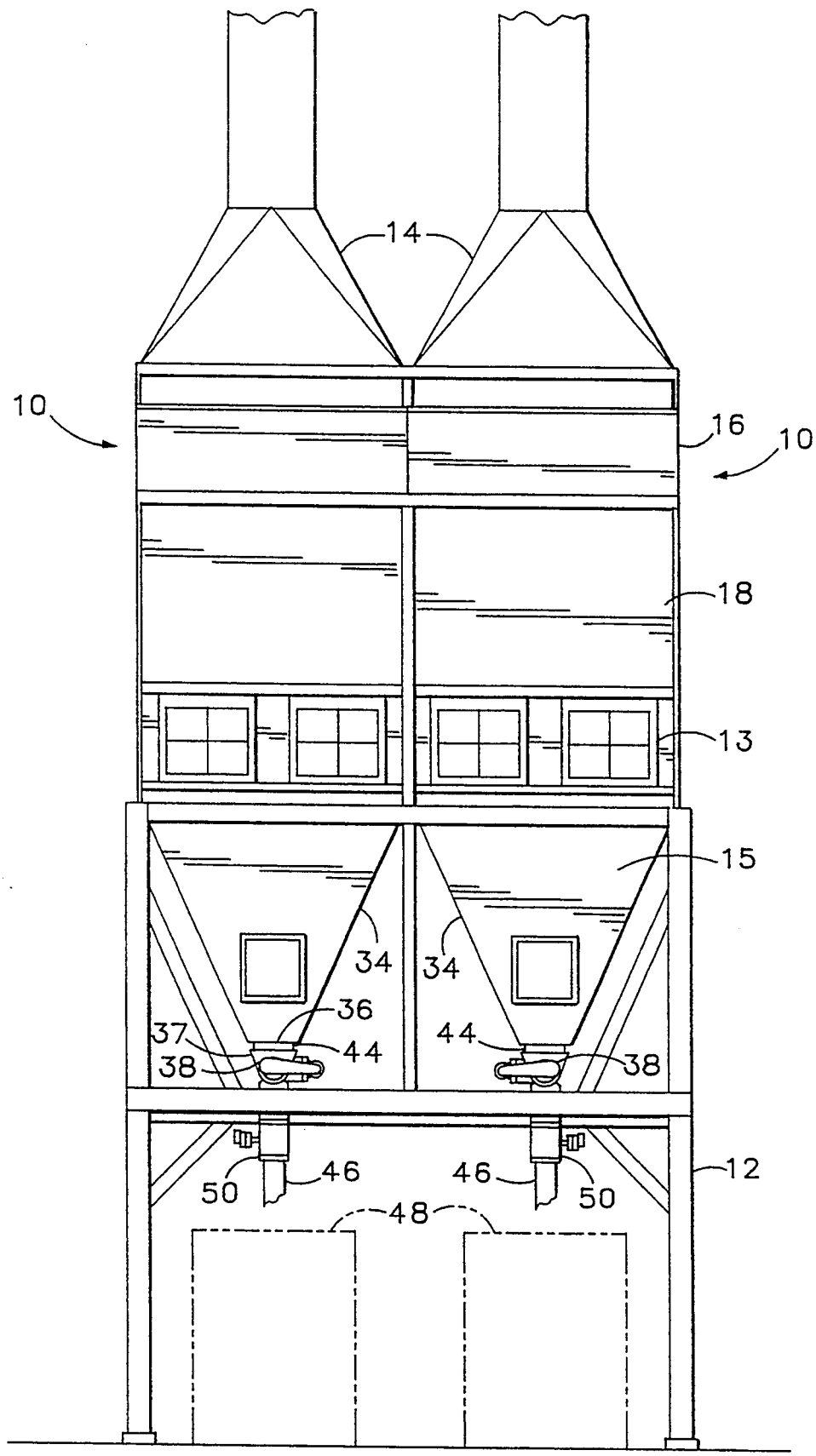
FIG. 2 shows an end view of a filter system according to the present invention.
Figure 3:
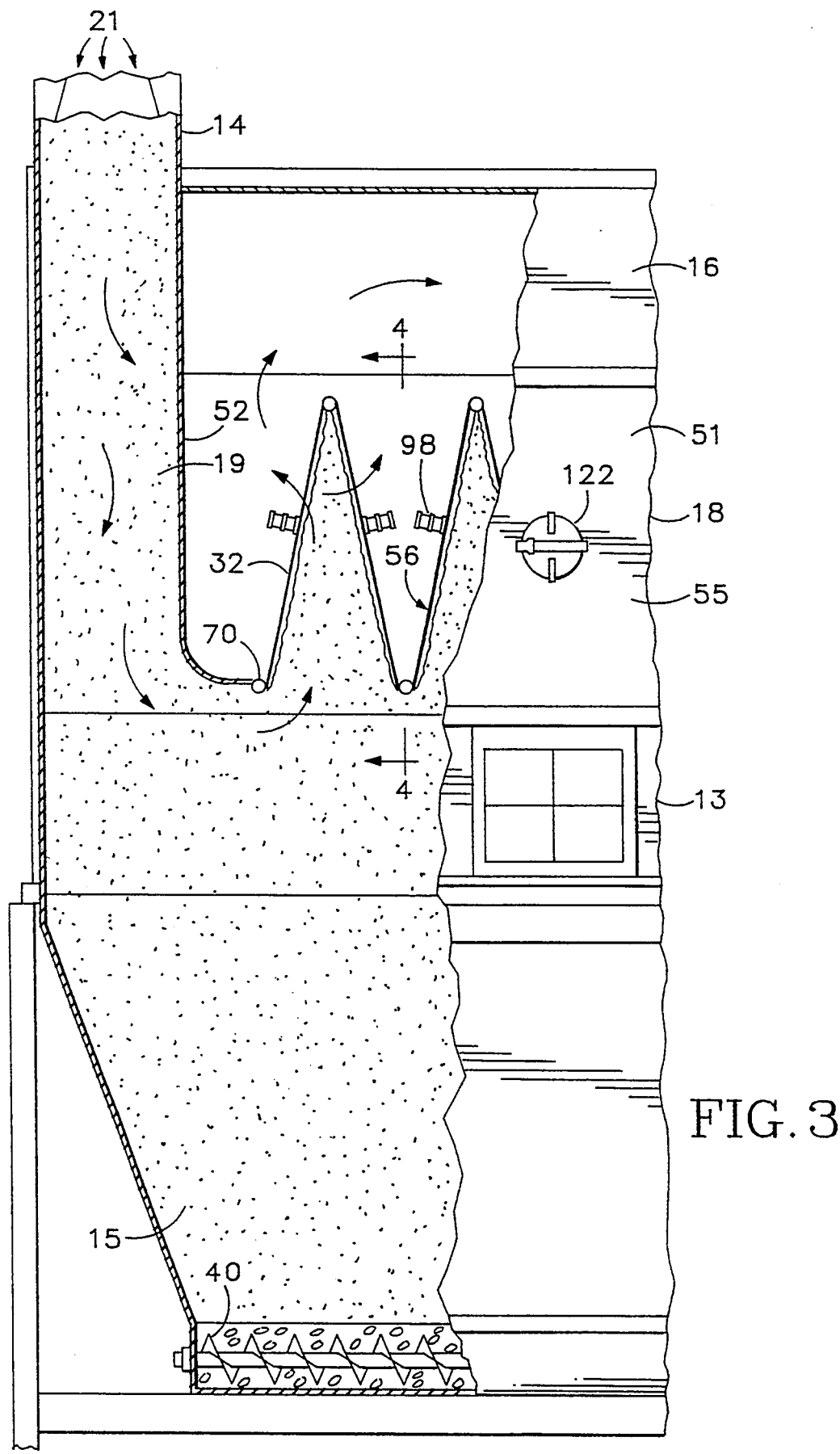
FIG. 3 shows an end cross-sectional view of a filter system according to the present invention.

Turning to FIGS. 1, 2 and 3, a filter system according to the present invention is shown generally at 10. In the preferred embodiment, a pair of filter systems 10 are installed on a common supporting frame 12. Filter system 10 includes four main subassemblies, vent section 16, filter section 18, plenum 13, and hopper 15, which are placed one atop the other as shown in FIG. 1. Vent section 16 and filter section 18 each include an enclosed inlet guide, 17 and 19 respectively, which together with inlet 14, receive the incoming air stream and 21 and guide it into plenum 13 below filter section 18. Air stream 21 then passes upwardly through filter section 18 and exits filter system 10 through outlet 30 in vent section 16.

As air stream 21 passes through filter section 18, entrained wood particles and fibers are removed by filter assembly 32 as described below, and collected in hopper 15. As best seen in FIGS. 2 and 3, hopper sidewalls 34 taper inwardly from top to bottom, directing the separated wood particles and fibers through hopper bottom opening 36, into housing 37 of auger assembly 38. Auger 40 is located within auger housing 37, and is driven by 2-3 hp electric auger drive motor (not shown). Auger 40 is preferably operated continuously to move the collected particles and fibers toward auger discharge 44, through which they are discharged from filter system 10 through discharge chute 46 into bin 48. Auger discharge 44 is preferably fitted with a discharge valve 50 to allow operation of filter system 10 for brief periods without the need to continuously discharge separated particles and fibers from hopper 15.

As mentioned above, air stream 21 is directed through plenum 13 and filter section 18 for removal of entrained solids. Plenum 13 is a hollow enclosure 36 feet long by 12 feet wide by 4½ feet high, and preferably is made from 10 gauge mild steel plate. Plenum 13 serves to receive air stream 21 from inlet guide 19 and distribute air stream 13 evenly into filter section 18. By use of plenum 13, the air pressure, and therefore the air flow, through filter section 18 is equalized along its length. Turning now to FIGS. 3-12, the operation of filter section 18 will be described in greater detail.

Figure 5:
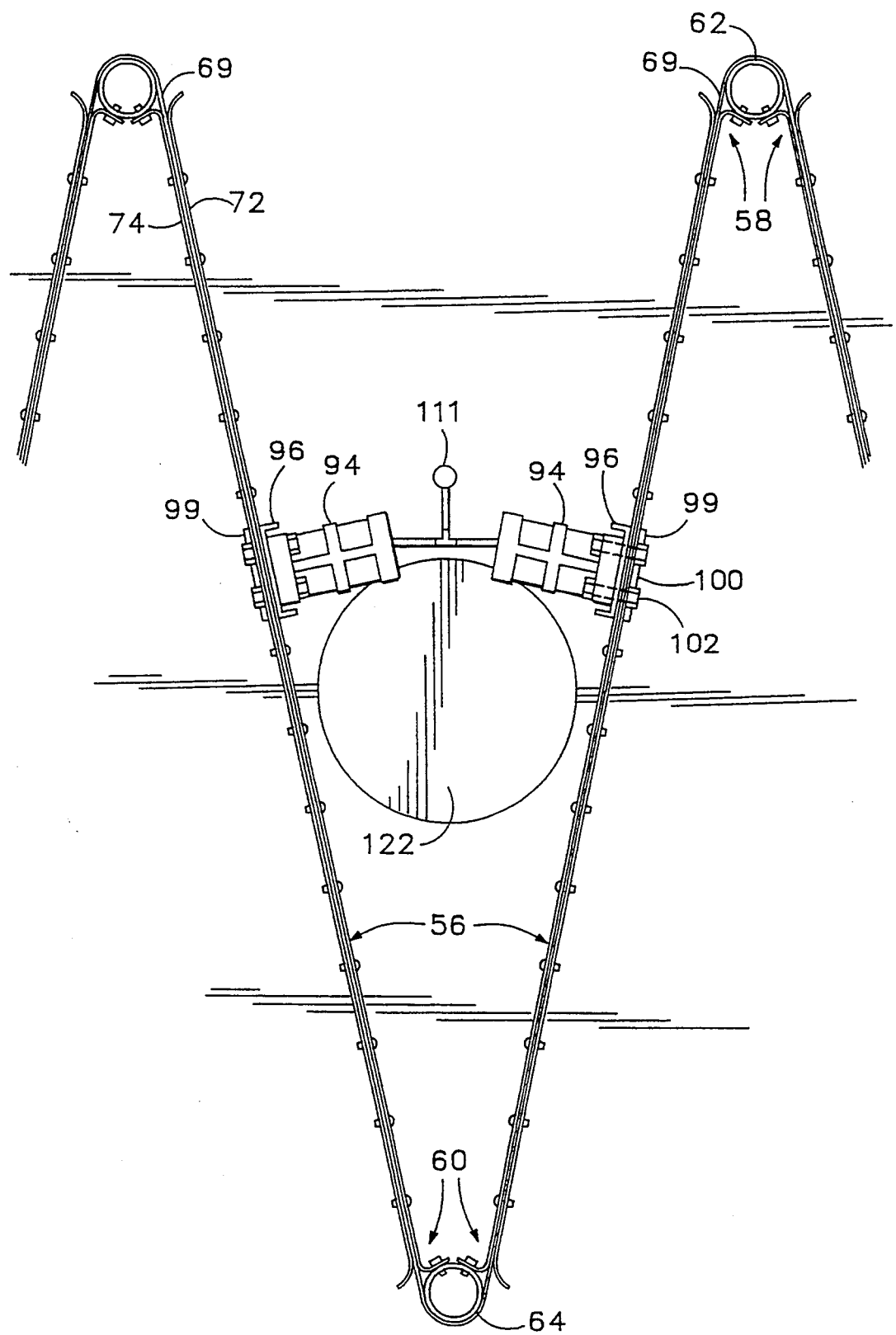
FIG. 5 shows a top view of a filter element assembly according to the present invention.

As best seen in FIG. 3, filter section 18 includes hollow filter housing 51 which is 36 feet long by 12 feet wide by 9 feet high, made form 10 gauge steel plate, and which is open at its top and bottom. Partition 52 extends vertically downward between its side walls 55 near one end to form inlet guide 19. Partition 52 preferably is curved inwardly near its bottom end to smooth the flow of air stream 21 as it changes direction entering plenum 13. Filter assembly 32 is disposed lengthwise within filter housing 51 lengthwise between partition 52 and end wall 54. Filter assembly 32 preferably consists of fifteen generally flat filter element assemblies 56 disposed angularly in a saw tooth pattern as shown in FIGS. 3 and 5. As shown in FIG. 5, the top ends 58 and bottom ends 60 of adjacent filter element assemblies 56 preferably share a common support 62 and 64 respectively. Top and bottom supports 62 and 64 are preferably 4" ID, schedule 113 steel pipe, which are supported at 48" intervals respectively by being welded or otherwise permanently attached at each end to filter housing side walls 55.

Figure 4:
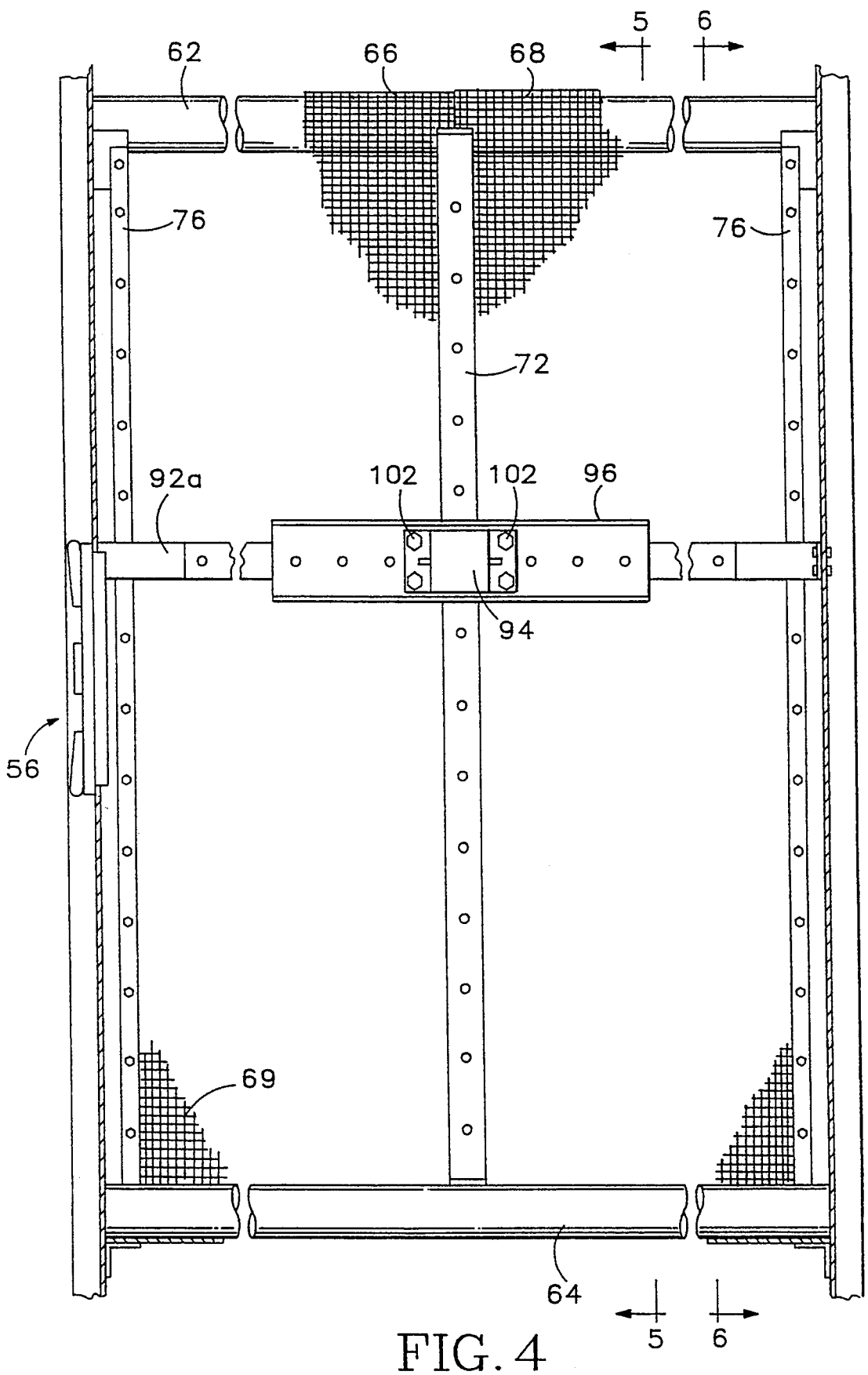
FIG. 4 shows a side cross-sectional view of a filter system according to the present invention.
Figure 6:
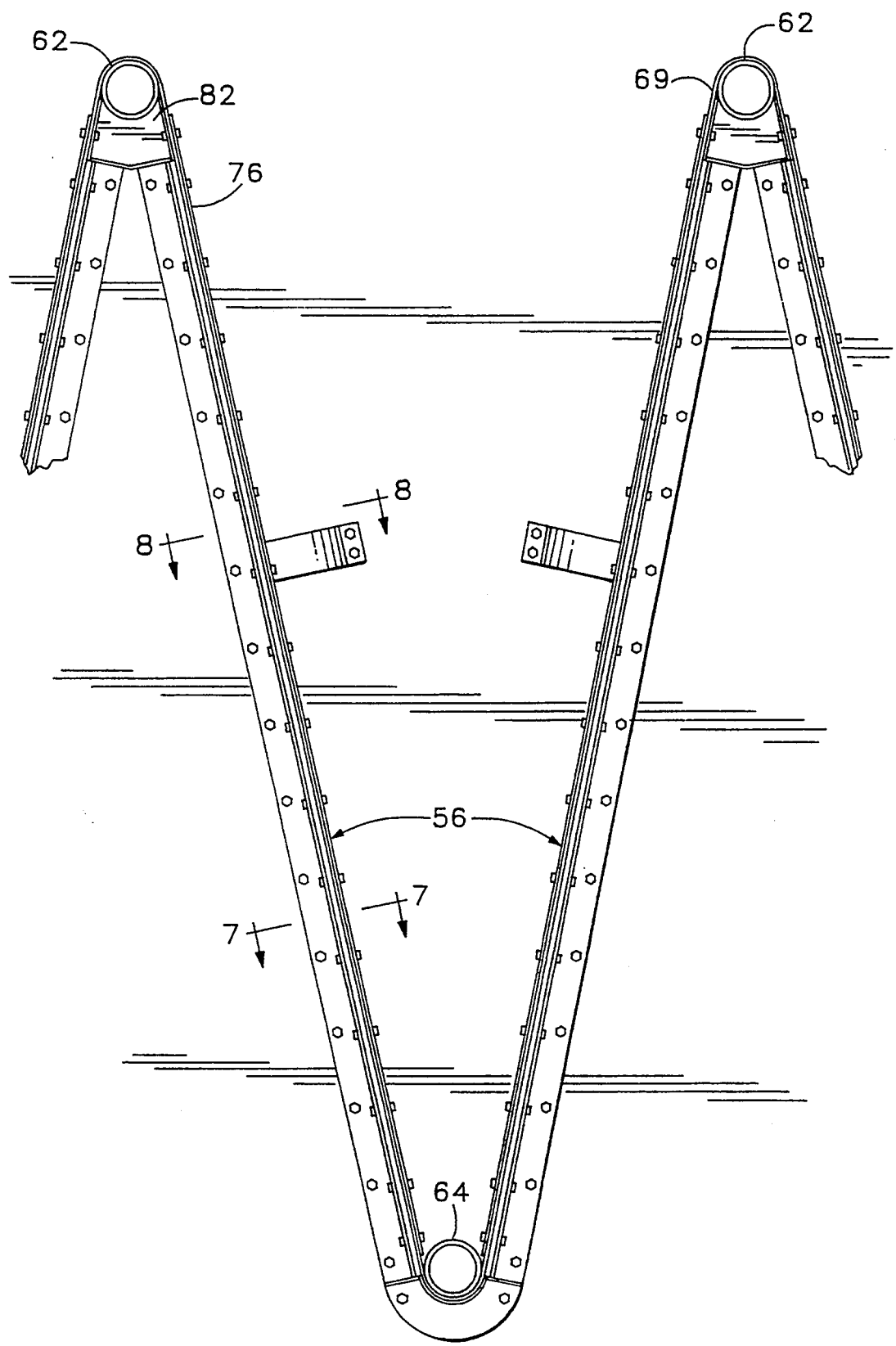
FIG. 6 shows a side view of a filter element assembly according to the present invention.

Referring now to FIGS. 4, 5 and 6, each filter element assembly 56 is assembled in place within filter housing 51 as follows. A pair of 6 foot wide, elongated filter screens 66 and 68 are each attached by one end to support 62 side-by-side. Filter screens 66 and 68 are preferably 6 mesh, 0.035 wire 304 stainless steel screen cloth 72" wide as manufactured by Cleveland Wire Cloth and Manufacturing. Screens 66 and 68 are then threaded in parallel around bottom and top supports 64 and 62 (FIGS. 1, 5) to form a series of flat screen sections 69 in a saw-tooth pattern as shown in FIG. 1. After being pulled taut, the free end of each of screens 66 and 68 is attached to end support 70. Screens 66 and 68 should be sufficiently taut to allow the screens to "bow" approximately 3" in operation as described below.

Figure 10:
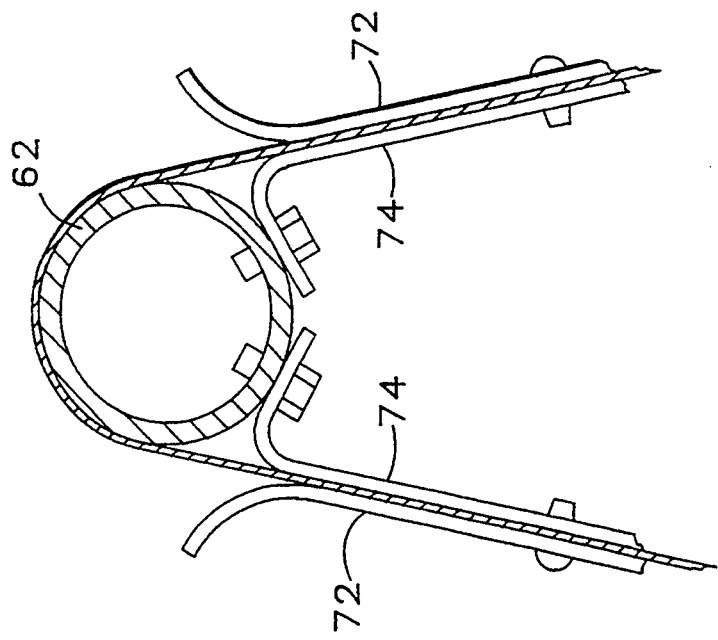
FIG. 10 shows a center cross-sectional view of the filter element assembly upper end and top support.
Figure 12:
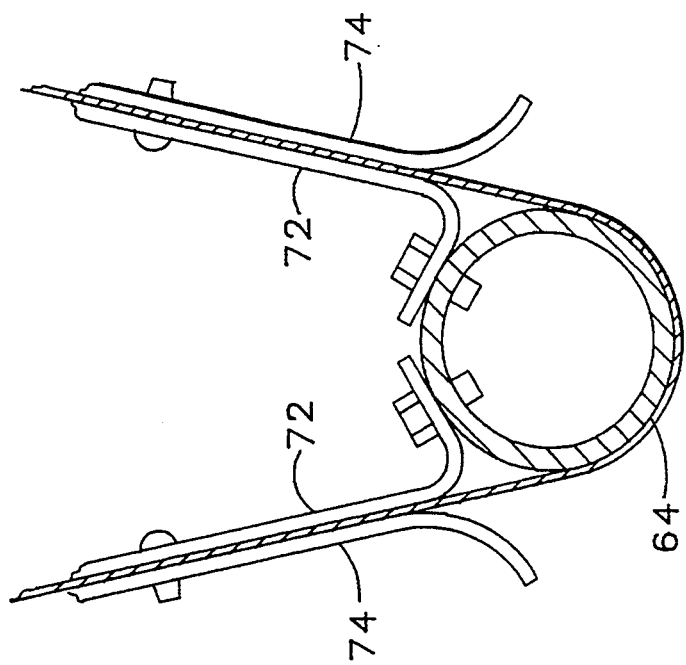
FIG. 12 shows a center cross-sectional view of the filter element assembly lower end and bottom support.

With screens 66 and 68 in place, a supporting framework for each flat screen section 69 is assembled as follows. Referring to FIGS. 4, 6, 10 and 12, upper and lower center stiffeners 72 and 74 are mounted between supports 62 and 64 on opposite sides of each flat screen section 69 along its longitudinal center line, overlapping and sandwiching the adjacent center edges of screens 66 and 68 to connect them together. (FIGS. 4, 6). Stiffeners 72 and 73, preferably made from 3" wide 10 gauge 304 stainless steel, are then riveted together with $\frac{1}{4}" \times 0.339"$ stainless steel rivets 74 at 6" intervals. As best seen in FIGS. 5 and 12, upper stiffener 72 is bent at its lower end and riveted to bottom support 64. Upper stiffener 72 is bent at its upper end as shown to accommodate the normal operational flexing of filter element 56 as described below without damaging screens 66 and 68. Referring to FIGS. 5 and 10, lower stiffener 74 is bent at its upper end and riveted to top support 62, and is bent at its lower end as shown to avoid damage to screens 66 and 68 during normal operational flexing.

Figure 7:
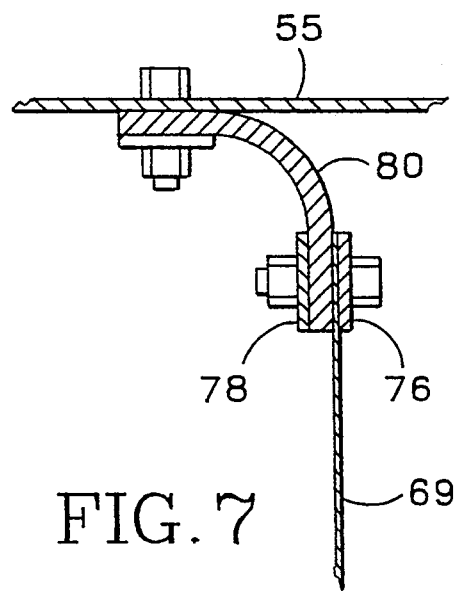
FIG. 7 shows a cross-sectional side view of a filter element assembly including the screen vibrator assembly.
Figure 9:
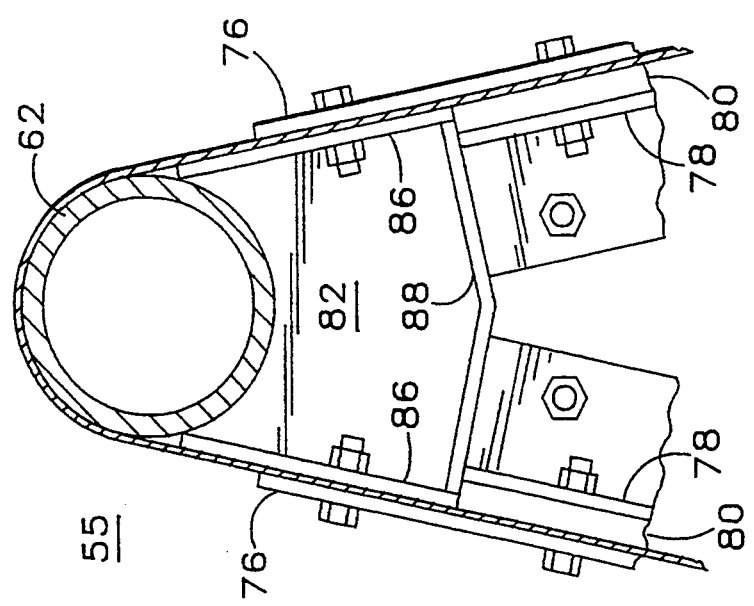
FIG. 9 shows an end cross-sectional view of the filter element assembly upper end and top support.
Figure 11:
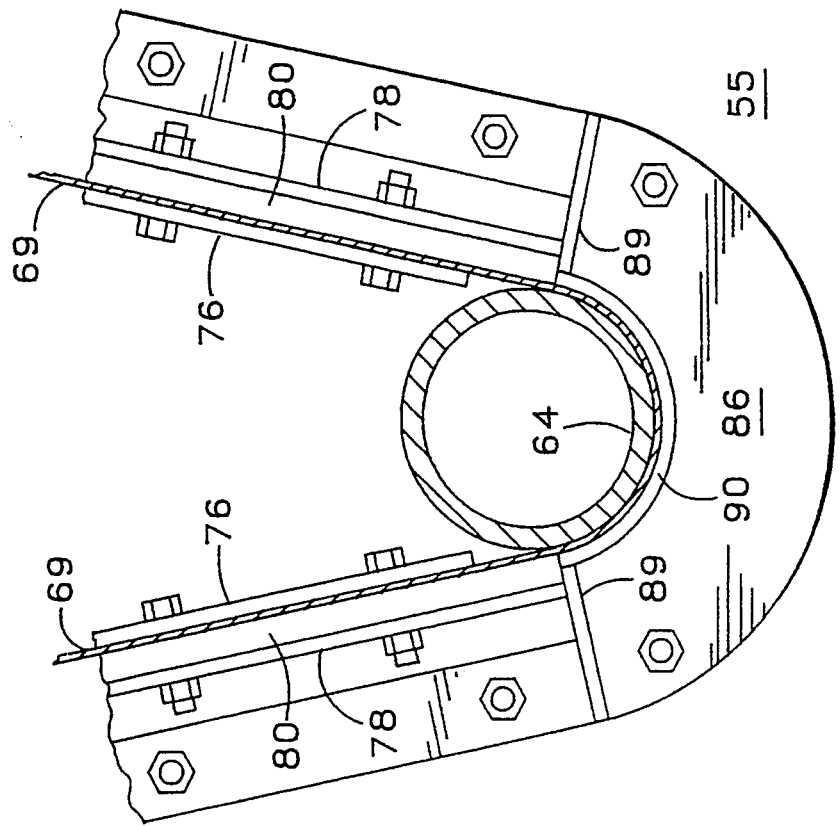
FIG. 11 shows an end cross-sectional view of the filter element assembly lower end and bottom support.

Referring now to FIGS. 4, 6, 9 and 11, upper and lower edge retainers 76 and 78, preferably made from $1\frac{1}{2}"$ wide 10 gauge 304 stainless steel, are fitted to the outer longitudinal edges of flat screen section 69 and connected to filter housing side walls 55 by means of rubber mounting strip 80 as follows. As best seen in FIGS. 6 and 9, upper pipe saddle 82 is welded onto side wall 55 beneath top support 62, with saddle side walls 86 and saddle bottom wall 88 extending outwardly away from filter housing side wall 55. Lower pipe saddle 86 as shown in FIG. 11 is bolted onto side wall 55 beneath bottom support 64, with side edges 89 and upper edge 90 extending outwardly from side wall 55. Upper and lower pipe saddles 82 and 86 are preferably made from 10 gauge 304 stainless steel. Upper edge retainer 76 is placed atop the outer edge of flat screen section 69, extending from adjacent to bottom support 64 and overlapping upper pipe saddle 82 as shown in FIG. 9. Rubber mounting strip 80, a 5" wide strip of nitrile rubber, and lower edge retainer 78 are then placed on the opposite face of the outer longitudinal edge of screen section 69 (FIGS. 6, 9). Upper edge retainer 76 is bolted to upper pipe saddle 82, and upper and lower edge retainers 76 and 78 are bolted together, sandwiching the screen edge and rubber mounting strip 80 between them. The inward edges of rubber mounting strip 80 and upper and lower edge retainers 76 and 78 are generally aligned, while rubber mounting strip 80 extends outwardly from between upper and lower edge retainers toward filter housing side wall 55. As best shown in FIG. 7, rubber mounting strip 80 is bent 90° along its length, and its bent portion is bolted flat against side wall 55.

Figure 8:
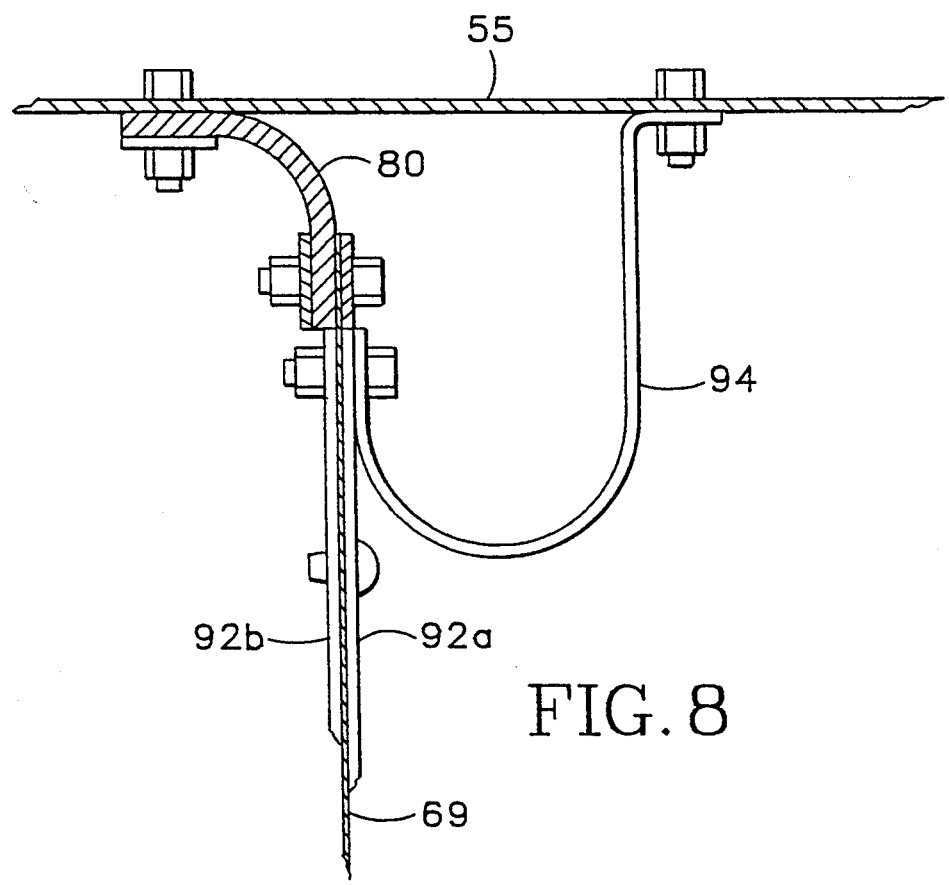
FIG. 8 shows a detail view of the filter element center support attachment to the side wall of the filter system.

Upper and lower lateral screen stiffeners 92a and 92b are then placed across screen section 69 on opposite sides at a point slightly above center (FIGS. 4, 8), and riveted together along their length. Lateral screen stiffeners are attached at their ends to filter housing side walls 55 by being bolted to spring mounts 94 (FIG. 8). Each spring mount 94 is, a strip of 3" wide 10 gauge 304 stainless steel, having its upper end bent outwardly 90° and bolted to filter housing side wall 55, and having its lower end bolted to lateral screen stiffeners 92a, b, near their ends. By means of rubber mounting strip 80 and spring mounts 94, filter element 56 is firmly but flexibly attached to filter housing side walls 55, and is free to move through its required range during operation as described below, while excess displacement is prevented.

In the preferred embodiment, each filter element assembly 56 is then fitted with an air driven impulse vibrator assembly 94 on its upper surface as shown in FIGS. 4 and 5, although the filter element assemblies may be used without the impulse vibrators. A 6" wide$\times$2" high 304 stainless steel mounting channel 96 3–6 foot long is centered along upper lateral stiffener 92a. Channel 96 has 9/16" holes drilled through its bottom to fit over rivets protruding from lateral stiffener 92a. Backing plate 99 is placed below lower stiffener 92b and aligned with mounting channel 96. Impulse vibrator 98 is then bolted to mounting channel 96 and backing plate 99 through corresponding bolt holes 100. Bolt holes 100 are preferably spaced to place the mounting bolts 102 astride the center and lateral stiffeners, rather than through them (FIG. 4).

Figure 13:
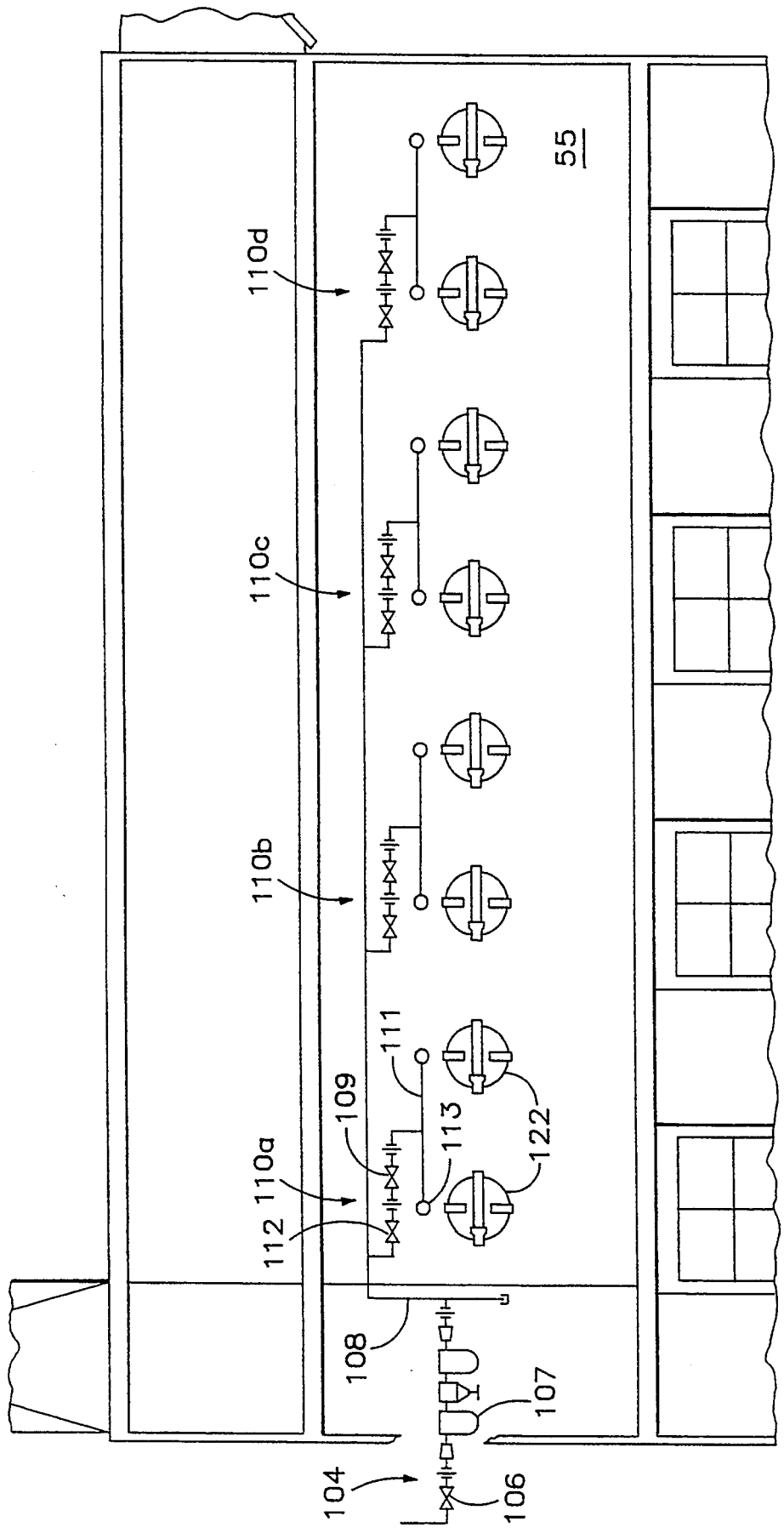
FIG. 13 is a schematic view of the filter system compressed air supply piping system.

Referring to FIGS. 5 and 13, compressed air is supplied to the impulse vibrator assemblies 94 in pairs through a compressed air system shown generally at 104. Compressed air at 150 psi is supplied to compressed air system 104 through $\frac{3}{4}"$ ball valve 106. Compressed air then passes through a combination filter/regulator/lubricator, 107 such as Ross Model 5M11B3311, and into vibrator air supply line 108 which is mounted to the exterior of filter side wall 55. Air supply line 108 supplies compressed 90 psi air to four manifolds 110a–d, each of which supplies compressed air to four impulse vibrators, except manifold 110a which supplies three impulse vibrators. Compressed air is admitted to each of manifolds 110a–d through a $\frac{3}{4}"$ ball valve 112, and a Ross Model 2073B5001 3-way 110 VAC solenoid valve 109, which is operated intermittently to admit air to its respective manifold. Each manifold 110a–d splits into two branches 111 which pass through side wall 55, and each of which in turn splits into two branches (except single branch 113), each of which is in turn connected to one impulse vibrator 69 by a flexible air hose, preferably Gates Model 198 $\frac{3}{8}"$ 180 psi air hose. Sidewall 55 is fitted with covered access openings 122 to allow access to the impulse vibrators and their associated supply piping within filter assembly 18 for maintenance and repair.

In operation, as shown in FIGS. 1–3, filter system 10 receives an approximately 45,000 scfm process air stream carrying entrained resinated solids through inlet 14. In one embodiment, the process air stream 21 is an overflow stream from a cyclone 114 containing entrained undersized resinated wood particles and fibers 118 separated from a process stream discharged from a resinated particle steam dryer unit (not shown) used in manufacturing fiberboard. Cyclone overflow air stream 21 enters filter system 10 through downcomer 116, inlet 14 and inlet guides 17 and 19. Air stream 21 enters plenum 13 which serves to reduces the velocity of the air stream, equalizes the pressure below filter assembly 32, and evenly distribute the flow of air stream 21 among the 15 filter element assemblies 56. The air velocity in the plenum 13 is preferably less than 300 feet per minute, which is the settling velocity of 500 micron or less normalized diameter resinated wood particles, to cause a portion of the particulate matter to settle out of the air stream. Air stream 21 then flows upwardly through filter element assemblies 56. A first level of separation of entrained solids occurs as air stream 21 reverses direction in the plenum 13. A portion of the entrained solids continue flowing downwardly rather than reversing direction with air stream 13, and collect in hopper 15. The remainder of the solids are carried upwardly toward filter assemblies 56 with air stream 13 as it reverses direction.

Figure 15:
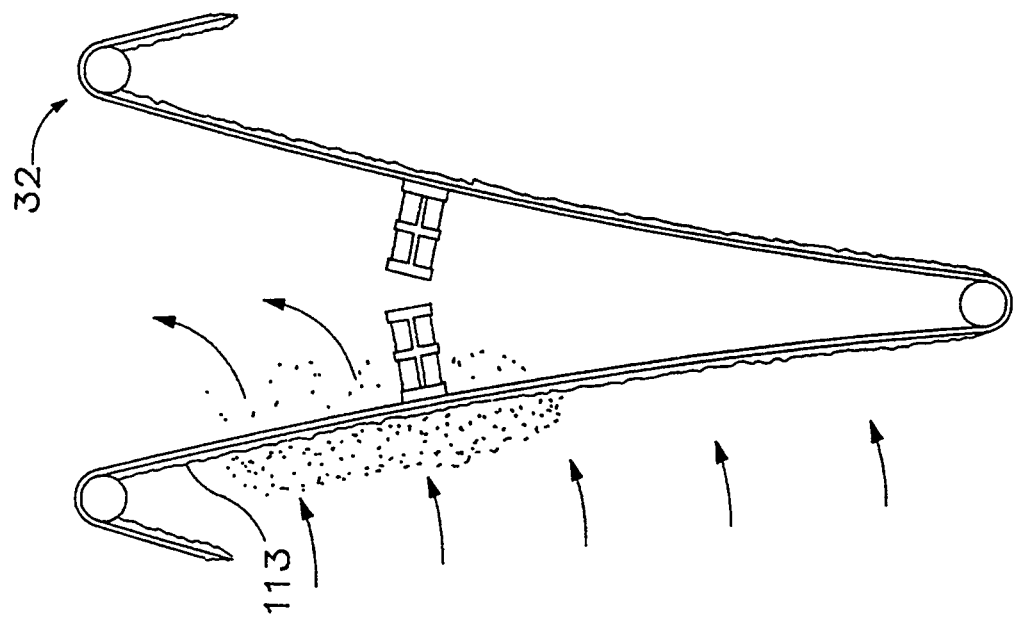
FIG. 15 is a schematic view showing the operation of the filter element assembly after the filtering layer has been formed.
Figure 14:
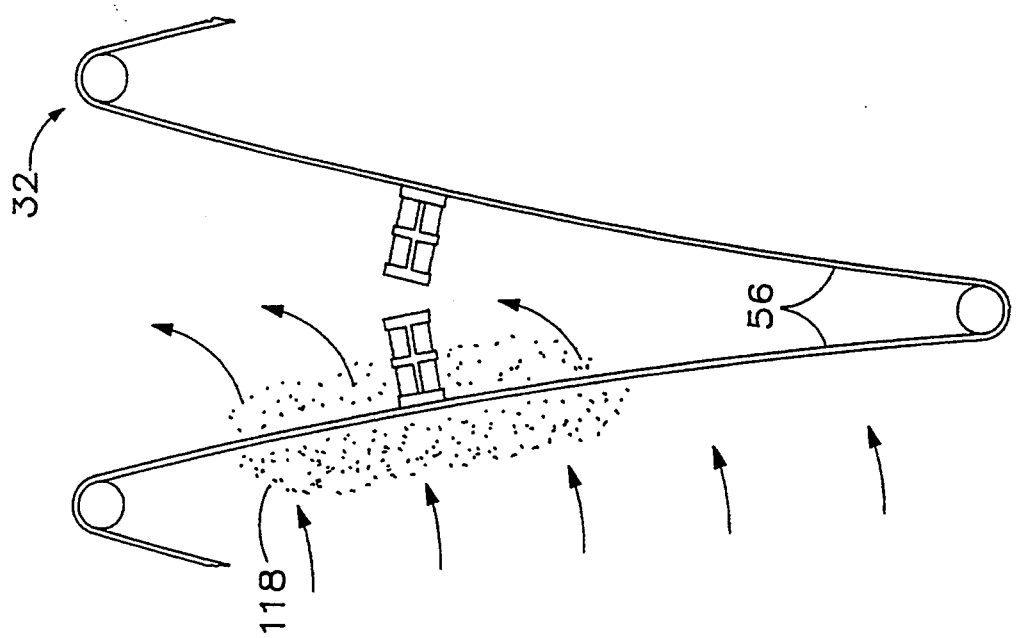
FIG. 14 is a schematic view showing the operation of the filter element assembly at initiation of the filtering operation.

As described above, filter assemblies 56 are flat sections of 6 mesh screen supported at an angle in a flexible frame and attached to the filter housing side walls 55. Turning to FIGS. 14–17, when air stream 21 first passes through filter elements assemblies 56 (FIG. 14), most of the entrained particles and fibers pass through with the air stream, owing to the relatively large openings presented by the 6 mesh screen. The resinated particles and fibers are somewhat sticky from the adhesive resin added in the fiberboard process, and those which impact the screen wires tend to stick and begin to accumulate, initiating the formation of a filtering layer 113 (FIG. 15). As more particles and fibers accumulate, the filter element openings are eventually covered. An increasing percentage of the entrained particles and fibers is retained on the filtering layer 113 as it grows in thickness. By the time the filtering layer 113 reaches a thickness of about ½", it is removing an extremely high percentage of the entrained particles and fibers 118. The pressure below filter assembly 32 and the force of air stream 21 against the underside of filter element assembly 56 bows the filter element downstream (which is upwardly at an angle) about 1 ½" at the center of the filter element assembly, and assists in holding filtering layer 113 in place against gravity (FIG. 15).

Figure 17:
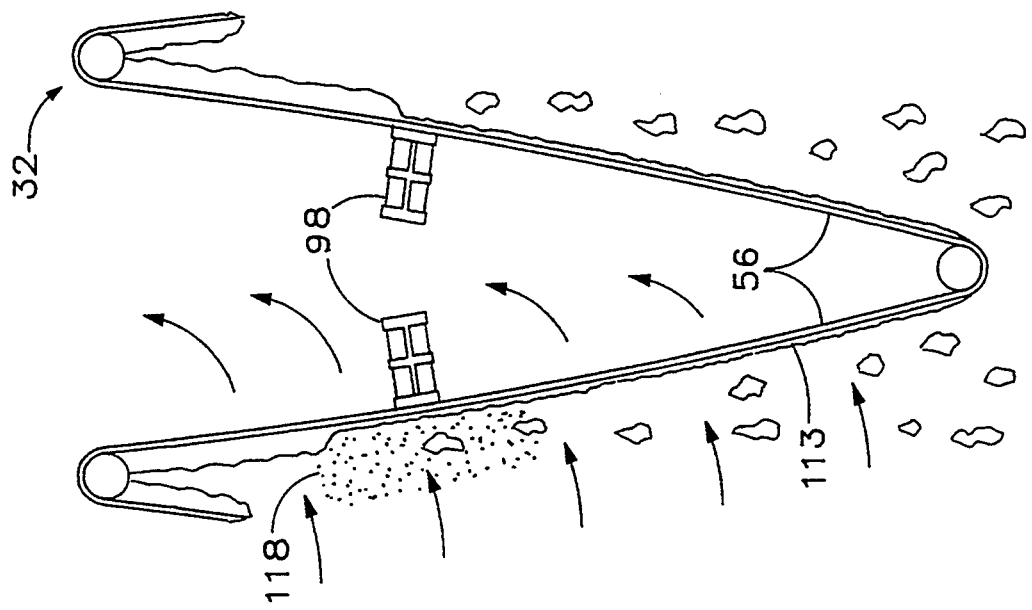
FIG. 17 is a schematic view showing the operation of the filter element assembly immediately after to operation of the impulse vibrator.
Figure 16:
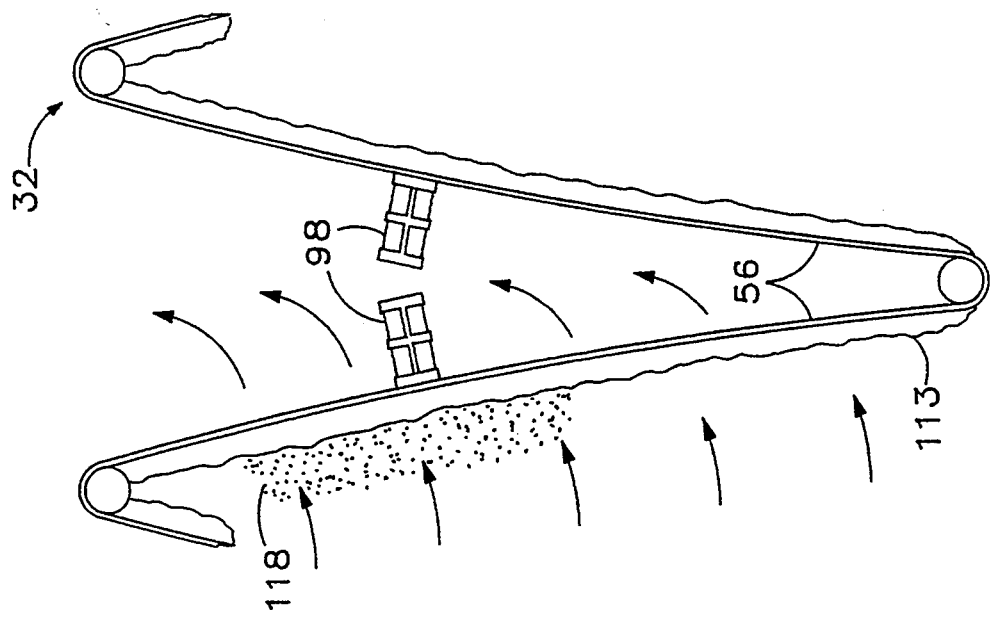
FIG. 16 is a schematic view showing the operation of the filter element assembly immediately prior to operation of the impulse vibrator.

As the filtering layer 113 continues to grow, its porosity decreases, and the flow of air stream 21 is increasingly restricted, increasing the pressure below filter assembly 32. The filtering layer eventually reaches a thickness, believed to be approximately 2 to 2 ½", where the flow of air stream 21 is restricted to a predetermined flow rate (FIG. 16). At this point, solenoid valve 109 is activated, directing a flow of compressed air to impulse vibrator 98. The action of impulse vibrator 98 momentarily deflects filter element assembly 56 upstream (downwardly), causing it to bow about 1 ½" in the upstream direction at its center (FIG. 17). This action causes an outer portion of filtering layer 113 to break away and fall into hopper 15, while about a portion 120 (believed to be approximately ½" thick) of filtering layer 113 remains on filter element 56. After impulse the vibrator is deactivated, filter element 56 returns to its previous position due to effect of the pressure in plenum 13 and the force of air stream 21, which is uninterrupted during this sequence. Since a portion of the filtering layer remains on filter element 56, there is no excessive breakthrough of solids through filter element 56 during or immediately after the activation of impulse vibrator 98.

As mentioned above, filter element assemblies 56 may be constructed without impulse vibrators 98. In that case, as filtering layer 113 continues to build in thickness, a portion of it will in most cases eventually shear and fall into hopper 15. We have found, however, that filtering layer 113 will not in all cases shear before an undesirably low filtering layer porosity is reached. Therefore, it is preferable to construct filter element assemblies 56 with impulse vibrators 98 to assure a means of maintaining a minimum desirable level of porosity, and therefore throughput capacity of the filter system 10.

The air velocity through filter elements 56 is preferably greater than 10 feet per minute, more preferably greater than 13 feet per minute, and most preferably greater than about 30 feet per minute. This represents an order of magnitude increase over air velocities achievable using a bag house system in which the air speed is normally limited to the range of 1–3 feet per minute. This advantage of the present invention allows a filter system according to the present invention to be significantly more compact, and therefore more economical to construct and operate.

After passing through filter section 18, air stream 13 is substantially free of the incoming solids, and passes into vent section 16. It is then discharged from filter system 10 through air stream outlet 30.

By way of example to show the effectiveness of the present invention, an unfiltered 45,000 scfm air stream leaving cyclone 114 was discharged directly into the surrounding atmosphere and found to discharge approximately 16.5 pounds per hour of entrained resinated particles to the surrounding atmosphere. In a second example, the air stream 21 was directed downwardly air through downcomer 116 but was not filtered; no reduction in the amount of discharged solids was realized. In the third example, the air stream 21 was directed downwardly air through downcomer 116 into a filter housing having no filter element assemblies installed; approximately 12.5 pounds per hour of entrained resinated particles were discharged to the surrounding atmosphere. This reduction is believed to represent the reduction in entrained solids resulting from the reversal of air flow in plenum 13. In the final example, the air stream was directed downwardly air through downcomer 116 into a filter system according to the present invention. Approximately 0.86 pounds per hour of entrained resinated particles were discharged to the surrounding atmosphere, representing a significant improvement in filtration realized by use of prior art filters. It is preferable that a filter system according to the present invention remove more than about 80% of the entrained solids, more preferably more than about 90%, and most preferably more than about 95%. It must be appreciated that the present invention requires considerably less expense and effort to install, operate, and maintain than a bag house installation, or other prior art filtering systems.

Referring to FIGS. 1,2, and 3, solids falling into hopper 15 collect in auger assembly housing 37 and are continuously conveyed by auger 40 (FIG.3) to solids discharge 44. The solids pass through solids discharge 44 and through discharge valve 50 and discharge chute 46 into bin 48. Bin 48 is periodically emptied as required.

When operated as described, the preferred embodiment is suitable for continuous operation. As will be recognized by those skilled in the art, size limitations on commercially available filter screen materials may impose an upper limit on the capacity of a filter system according to the present invention. It may be therefore preferable to operate two identical units side-by-side in tandem. The inlets of the side-by-side units may or may not be interconnectable. In this way, the required total capacity can be achieved, and an operational problem in one unit will not cause the entire filtering process to be halted.

Having describe the preferred embodiment of the present invention, those skilled in the art will recognize numerous changes in detail, dimensions and materials which may be made without departing from the scope of the following claims.

We claim:

1. A filter system for filtering an air stream containing ligno-cellulosic particles and fibers comprising:
   means defining an air stream inlet for receiving an air stream containing ligno-cellulosic particles and fibers;
   means for directing said air stream along a predetermined path, said air stream flowing in a generally upward direction along at least a portion of said path;
   a filter assembly disposed in said path for removing said particles and fibers from said upwardly flowing air stream; and
   said filter assembly comprising a non-horizontal, foraminous filter element and a foraminous filtering layer comprising said ligno-cellulosic particles and fibers formed thereon, at least a portion of said foraminous filtering layer remaining during filtering of said air stream and having a minimum porosity sufficient to allow said air stream to pass therethrough.

2. A filter system according to claim 1, said filter element having openings therethrough which are sized to allow said air stream to pass therethrough, and said foraminous filtering layer being formed in situ by retaining a portion of said particles and fibers on said filter element.

3. A filter system according to claim 1, which further comprises means for maintaining said minimum filter layer porosity.

4. A filter system according to claim 3, wherein said means for maintaining said minimum filter assembly porosity comprises means for intermittently reducing the thickness of said filter layer by removing a portion thereof.

5. A filter system according to claim 4, which further comprises a collector for receiving said intermittently removed filter layer portions.

6. A filter system according to claim 5, which further comprises means for removing said collected filter layer portions from said filter assembly.

7. A filter system according to claim 4, wherein said filter layer removal means comprises means for intermittently vibrating said filter assembly.

8. A filter system according to claim 4, wherein said filter layer removal means is activated in response to a predetermined pressure drop across said filter assembly.

9. A filter assembly according to claim 1, wherein said filter element comprises a screen.

10. A filter assembly according to claim 1, wherein said filter assembly further comprises a plurality of non-horizontal filter elements, each of said filter elements having a foraminous layer formed thereon.

11. A filter assembly according to claim 7, wherein said plurality of filter elements are arranged in a generally sawtooth pattern.

12. A filter assembly according to claim 9, wherein said filter element comprises a 6-mesh screen.

13. A method for removing ligno-cellulosic particles and fibers from an air stream comprising the steps of:
   providing a filter assembly comprising means defining an air stream inlet for receiving an air stream containing ligno-cellulosic particles and fibers, means for directing said air stream in a generally upward direction, and a filter assembly disposed in said path for removing said particles and fibers from said upwardly flowing air stream;
   said filter assembly comprising a non-horizontal, foraminous filter element having openings therethrough which are sized to allow said air stream to pass therethrough while retaining a first portion of said particles and fibers on said filter element;
   introducing an air stream containing ligno-cellulosic particles and fibers into said air inlet and passing said air stream through said filter element;
   forming a foraminous filtering layer comprising a first and second portion of said particles and fibers on said filter element;
   removing said second portion of said particles and fibers from said foraminous filtering layer;
   retaining said first portion of particles and fibers on said filter element, thereby forming a foraminous filtering layer of said particles and fibers having a minimum porosity sufficient to allow said air stream to pass therethrough; and
   discharging a filtered air stream from said filter system.

14. The method of claim 13, further comprising the step of continuously discharging said filtered air stream from said filter system.

15. The method of claim 13, wherein the step of removing said second portion of said particles and fibers from said foraminous filtering layer comprises intermittently reducing the thickness of said filter layer by removing a portion thereof.

16. The method of claim 13, wherein the step of removing second portion of said particles and fibers from said foraminous filtering layer comprises intermittently vibrating said filter assembly.

17. The method of claim 15, wherein the step of reducing the thickness of said filter layer by removing a portion thereof is initiated in response to a predetermined pressure drop across the filter assembly.

18. The method of claim 13, wherein said filter element comprises a screen.

19. The method of claim 13, wherein said filter assembly further comprises a plurality of non-horizontal filter elements.

20. The method of claim 19, wherein said plurality of filter elements are arranged in a generally sawtooth pattern.

21. The method of claim 13, wherein said air stream containing entrained solids is passed through said filter element at a velocity greater than 20 feet per minute.

22. The method of claim 13, wherein said filtering system removes more than approximately 90% of said entrained solids from said air stream containing entrained solids.

23. The method of claim 13, wherein said filtered air stream discharged from said filter system discharges less than about 2 pounds per hour of entrained solids to the surrounding environment.

24. A method for removing ligno-cellulosic particles and fibers from an air stream comprising the steps of:

providing a filter assembly comprising means defining an air stream inlet for receiving an air stream containing ligno-cellulosic particles and fibers, means for directing said air stream in a generally upward direction, and a filter assembly disposed in said path for removing said particles and fibers from said upwardly flowing air stream;

said filter assembly comprising a non-horizontal, foraminous filter element having openings therethrough which are sized to allow said air stream to pass therethrough while retaining a first portion of said particles and fibers on said filter element;

introducing an air stream containing ligno-cellulosic particles and fibers into said air inlet and passing said air stream through said filter element;

forming a foraminous filtering layer comprising a first and second portion of said particles and fibers on said filter element;

removing said second portion of said particles and fibers from said foraminous filtering layer by intermittently reducing the thickness of said filter layer by removing a portion thereof;

retaining said first portion of particles and fibers on said filter element, thereby forming a foraminous filtering layer of said particles and fibers having a minimum porosity sufficient to allow said air stream to pass therethrough; and continuously discharging a filtered air stream from said filter system.

* * * * *